US008504565B2

(12) United States Patent
Pitts

(10) Patent No.: US 8,504,565 B2
(45) Date of Patent: Aug. 6, 2013

(54) FULL TEXT SEARCH CAPABILITIES INTEGRATED INTO DISTRIBUTED FILE SYSTEMS— INCREMENTALLY INDEXING FILES

(76) Inventor: William M. Pitts, Los Altos, CA (US)

( * ) Notice: Subject to any disclaimer, the term of this patent is extended or adjusted under 35 U.S.C. 154(b) by 1725 days.

(21) Appl. No.: 11/223,572

(22) Filed: Sep. 9, 2005

(65) Prior Publication Data

US 2006/0053157 A1  Mar. 9, 2006

Related U.S. Application Data

(60) Provisional application No. 60/608,229, filed on Sep. 9, 2004, provisional application No. 60/621,208, filed on Oct. 22, 2004.

(51) Int. Cl.
*G06F 7/00* (2006.01)
*G06F 17/30* (2006.01)

(52) U.S. Cl.
USPC ........... 707/736; 707/739; 707/741; 707/742; 707/747

(58) Field of Classification Search
USPC ................. 707/736, 739, 741, 742, 743, 744, 707/745, 746, 747
See application file for complete search history.

(56) References Cited

U.S. PATENT DOCUMENTS

| | | | |
|---|---|---|---|
| 5,611,049 A | 3/1997 | Pitts | |
| 5,892,914 A | 4/1999 | Pitts | |
| 5,946,690 A | 8/1999 | Pitts | |
| 6,026,452 A | 2/2000 | Pitts | |
| 6,085,234 A | 7/2000 | Pitts | |
| 6,205,475 B1 | 3/2001 | Pitts | |
| 6,366,952 B2 | 4/2002 | Pitts | |
| 6,505,241 B2 | 1/2003 | Pitts | |
| 6,745,206 B2 | 6/2004 | Mandler | |
| 6,804,706 B2 | 10/2004 | Pitts | |
| 6,847,968 B2 | 1/2005 | Pitts | |
| 7,043,472 B2 * | 5/2006 | Aridor et al. | 707/3 |
| 7,051,017 B2 * | 5/2006 | Marchisio | 707/3 |
| 7,305,381 B1 * | 12/2007 | Poppink et al. | 707/3 |
| 7,941,439 B1 * | 5/2011 | Lawrence et al. | 707/769 |
| 2003/0046313 A1 * | 3/2003 | Leung et al. | 707/204 |
| 2004/0205044 A1 * | 10/2004 | Su et al. | 707/2 |
| 2004/0243560 A1 | 12/2004 | Broder et al. | |

OTHER PUBLICATIONS

Badue, C., Baeza-Yates, R., Ribeiro-Neto, B., Ziviani, N., "Distributed Query Processing Using Partitioned Inverted Files," Proceedings of SPIRE 2001, IEEE CS Press, Laguna San Rafael, Chile, pp. 10-20, Nov. 2001.

Claburn, T., "Search Startup Blinkx Aims High," Information Week, p. 54, Oct. 4, 2004.

(Continued)

*Primary Examiner* — Vincent F Boccio
(74) *Attorney, Agent, or Firm* — DLC Patents, PLLC; Dustin L. Call

(57) ABSTRACT

A hierarchical distributed search mechanism is integrated into a distributed file system. Traditional file system APIs (create, open, close, read, write, link, rename, delete, . . . ) and the over-the-wire protocols employed to project these APIs into remote client sites (CIFS, NFS, DDS, Appletalk) are extended to enable the dynamic creation of temporary directories containing links to objects identified by search engines (executing at sites "close" to "their" data) as meeting the search criteria specified by the first parameter of a search function call. The search function, derived from the standard file system API function create, is added to the file system API.

6 Claims, 4 Drawing Sheets

OTHER PUBLICATIONS

Gincel, R., "Focusing Enterprise Search," Infoworld, pp. 36-42, Oct. 18, 2004.

Melnik, S., Raghavan, S., Yang, B., Garcia-Molina, H., "Building a Distributed Full-Text Index for the Web," Proceedings of the 10th International Conference on World Wide Web, Hong Kong, pp. 396-406, 2001.

Riberio-Neto, B. A., Kitajima, J. P., Navarro, G., Sant'Ana, C. R. G., Ziviani, N., "Parallel Generation of Inverted files for Distributed Text Collections," XVIII Int. Conference of the Chilean Computer Society, Antofagasta, Chile, 1998.

* cited by examiner

Fig. 3         Prior Art

FULL TEXT SEARCH CAPABILITIES INTEGRATED INTO DISTRIBUTED FILE SYSTEMS— INCREMENTALLY INDEXING FILES

CLAIM OF PROVISIONAL APPLICATION RIGHTS

This application claims the benefit of U.S. Provisional Patent Application Nos. 60/608,229 filed on Sep. 9, 2004, and 60/621,208 filed Oct. 22, 2004.

BACKGROUND

1. Technical Field

The present disclosure relates generally to full text indexing and searching applied to distributed file systems.

2. Description of Background Art

The volume of information contained within a single file system has increased dramatically since file systems were first designed and implemented. Whereas early file systems managed tens of megabytes of data, today's distributed file systems often encompass tens of terabytes. This represents a million fold increase, and the end is not in sight. Consider the following:

The storage capacity of a 3.5" disk drive is projected to increase from today's 250 gigabytes to 25 terabytes.

A single file server typically exports the file systems resident on many disk drives.

Global file systems, now being deployed, will wrap hundreds or thousands of file servers into a single virtual file server.

The volume of data contained within a file system will be so enormous that information may be lost within the file system! Current file systems provide only a very limited ability to locate particular information contained in the system's files.

Over time, the file system application programming interface ("API") of the earliest file system implementations has been enhanced to include new functionalities. And, it is time once again to extend the definition and capabilities of a file system.

Distributed Data Service ("DDS") is a distributed file system that integrates industry standard file servers (Unix, Linux, Windows, Mac) into highly distributed, multi-protocol virtual file servers of vast proportions. A single DDS virtual file server may encompass hundreds of petabytes. Fundamental concepts underlying a DDS virtual file server are disclosed in U.S. Pat. Nos. 5,611,049, 5,892,914, 6,026,452, 6,205,475, 6,366,952(B2), 6,505,241(B2) and 6,804,706(B2). All of the immediately preceding United States patents are hereby incorporated by reference as though fully set forth here.

DDS global file systems accessible via a DDS virtual file server encompass entities that might not normally be thought of as files, so when describing DDS global file systems the term object is often used to denote a superset class which includes what is conventionally identified as a file.

The object related definitions are:

Object
A named entity represented within a namespace to which a connection can be established for the purpose of reading or writing data. The most common type of object is a file, but other types include:
directories, domains, and other containers,
live video feeds,
application programs, and
shared memory.

Object system
A provider of objects. For example, a file system (a type of object system) contains a collection of files and it provides a service through which its content may be accessed.

Provider
A synonym for object system.

Namespace
A set of names in which all names are unique. All objects within an object system have at least one name, and the complete set of all names for all objects comprises the object system's namespace.

DDS constructs virtual file servers from heterogeneous collections of industry standard file servers. A single DDS virtual file server provides a highly distributed file service, perhaps, incorporating as many as thousands of geographically dispersed file servers. As stated previously, DDS is also capable of providing remote access to objects other than files, such as live video feeds. Accordingly, the term "object" is generally used throughout this document to denote a file, a data stream, or some other data entity that might stretch the definition of "file".

The DDS architecture provides a framework for highly distributed, multi-protocol file caching. FIG. 1 illustrates a basic structure for a DDS cache module referred to by the general reference character 20. The DDS cache module 20 may be installed on file servers, client workstations, and intermediate network nodes such as routers, switches, and dedicated file caching appliances.

DDS implements a file level cache 22 layered above all data sources. A data source is usually a file system, either local or remote, but it could be, for example, a real time data stream. When appropriate, each DDS cache module 20 automatically caches whatever data is being accessed through its file level cache 22 regardless of the source of data.

Individual file level caches 22, using both local RAM and local disk for data storage, may vary dramatically in size. Some DDS cache modules 20, perhaps within switches and routers, may implement only RAM based caching. Other DDS cache modules 20 in high capacity locations might be configured with 16 gigabytes of RAM and a terabyte or more of disk storage.

Although some current distributed file system implementations employ callback mechanisms to synchronously invalidate file images cached "just below" the multiple client processes accessing a shared file, all processes remain unaware of the consistency operations. When a process reads a file, the response includes the most recently written data (the modification), and whatever consistency operations were required to ensure the currency of the response remains hidden from file system clients.

Sprite, CIFS, and NFSv4 each implement consistency callback mechanisms as described above. Therefore, since cache consistency is maintained through private communications between the server and the client components of these distributed file systems, it is impossible for one process to detect another process's modification of a shared file except by reading the file. Consequently, detecting shared file modifications when using distributed file systems such as Sprite, CIFS, and NFSv4 requires use of a polling loop that periodically reads the shared file.

All DDS cache modules 20 maintain the consistency of cached images via origin file server callbacks. Files which are in use or have been recently used are registered with the origin file server, and may receive a callback (at the onset of a concurrent write sharing condition) to invalidate or flush the cached file image. DDS incorporates a consistency disconnect-reconnect mechanism, described in U.S. Pat. No. 5,946,690 ("the '690 patent"), whereby a cached file image, including the file's metadata, may be disconnected from the origin file server and then, at a later time (weeks, months, years), reconnected and revalidated. This is an essential mechanism for implementing high capacity, long term (persistent) caches. The '690 patent is hereby incorporated by reference.

A DDS cache module 20, illustrated in FIG. 1, includes five major components:

File Level Cache 22—The file level cache 22 consists of a large number of channels (10,000 to 100,000). Each channel is a data structure that contains (or has pointers to) consistent data/metadata images of a (usually) remote source object. Channels also contain data structures that track client access patterns, measure rates of consumption by clients and the rate of replenishment from the origin file server.

Channels are managed on a least recently used ("LRU") basis and are identified by an object id. A simple hash mechanism allows an incoming file system request to be connected to the appropriate channel within a microsecond or two. Background processes strive to ensure that, for well-mannered clients, channels are primed such that incoming requests are immediately serviced with no need to block while waiting to fetch data from downstream (closer to the origin file server).

Just before a channel is reassigned to a new object, its contents are written to a disk cache if one exists at this DDS cache module 20, not illustrated in FIG. 1. Disk caches are also managed on an LRU basis.

The file level cache 22 also incorporates a redirector 24. All cache misses are passed on to the redirector 24, even when the source object resides within a local file system.

Source Provider Interface Routines 32—For any given file with multiple active clients distributed about the network, there exists a tree structured hierarchy of DDS cache modules 20 rooted at a DDS Server Terminator Site. The DDS Server Terminator Site communicates directly with the origin server for a file. The Source Provider Interface Routines 32 ("SPIRs 32") interface one or more local file systems to the DDS cache module 20, e.g. NTFS, UFS, RDR . . . . When a DDS cache module 20 is the DDS Server Terminator Site for a file, the file level cache 22 accesses the file via one of the SPIRs 32

Client Intercept Routines 42—A set of client intercept routines 42 provide industry standard local and remote file services directly to clients. The DDS cache module 20 with which a client communicates directly via one of the client intercept routines 42 is the DDS Client Terminator Site for that client. FIG. 1 depicts a DDS cache module 20 configured with three client intercept routines 42: UFS, CIFS, and NFS. Unmodified Windows clients communicating directly with this DDS cache module 20, for example, may use the CIFS protocol to access file data sourced from a Unix file server that is remote from this DDS cache module 20, or for which this DDS cache module 20 is the file's DDS Server Terminator Site. Local processes running on the system hosting this DDS cache module 20 may access the same file data via the UFS (Unix File System) client intercept routine 42.

Each file's metadata is represented within file level cache 22 as a discriminated union: the discriminator identifies 'UFS' as the source file system and the union contains the file's metadata as formatted by the UFS source provider routine on the file's origin server. When a particular DDS cache module 20 services NFS or UFS requests, no protocol translation is necessary. However, the CIFS client intercept routine 42 must be configured with a UFS to CIFS translation module so 'UFS' files may be accessed via the CIFS protocol.

Note that local clients may use the UFS interface to access remote files via the DDS cache module 20.

DDS Client Code 52—When a file level cache 22 requires additional file data and the DDS cache module 20 is not the DDS Server Terminator Site for the file, the file level cache 22 invokes DDS Client code 52 to fetch missing file data. To access missing file data, the DDS Client code 52 generates and dispatches a network request expressed in a DDS protocol directed toward the file's DDS Server Terminator Site.

DDS Server Code 62—A DDS Server code 62 code receives requests dispatched by the DDS Client code 52 at an upstream DDS cache module 20, i.e. a DDS cache module 20 which is or is closer to the DDS Client Terminator Site. The DDS Server code 62 implements the DDS protocol.

DDS Protocol

The DDS protocol is a remote file access protocol, providing functionality comparable to NFS and/or CIFS. It is designed to efficiently stream file data and metadata into large RAM/disk caches distributed throughout a network, and to maintain the consistency of cached images at a level which approaches that of a local cache. The DDS protocol transfers and caches images of files and objects from many different sources (UFS, VxFS, NTFS file systems, video cameras, . . . ) with no "image degrading" translations between the source object and its cached image. Protocol translation is always performed at DDS Client Terminator Sites, and is required only for heterogeneous (with respect to the origin file server) clients.

The DDS protocol, as currently implemented, consists of five operations:

DDS_CONNECT—This operation connects to an existing file, directory, or file system, and optionally creates a new file or directory if it doesn't already exist. If successful, this operation returns a file handle. This operation supplies the functionality required by the NFS operations mount, lookup, create, and mkdir.

DDS_NAME—This operation manipulates names in various ways. It supplies the functionality required by the NFS operations link, symlink, rename, remove, and rmdir.

DDS_LOAD—This operation loads data and metadata. The request includes flags (DDS_CC_SITE_READING, DDS_CC_SITE_WRITING) that inform downstream DDS cache modules 20 what types of operations will be performed upon data/metadata images cached at the DDS cache module 20. These flags are used by DDS's distributed consistency mechanism to keep track of the types of file activities occurring at various DDS cache modules 20.

A single load or flush request may specify multiple file segments, and each segment may be up to 4 gigabytes in length.

The response to a load or flush request includes flags (DDS_CC_SUSTAIN_DIR_PROJECTION, and DDS_CC_SUSTAIN_FILE_PROJECTION) that indicate whether the returned data/metadata may be cached or whether it must be discarded immediately after responding to the current client request.

The DDS_LOAD operation supplies the functionality required by the NFS operations statfs, getattr, setattr, read, write, readdir, and readlink.

DDS_FLUSH—This operation flushes modified data downstream towards the DDS Server Terminator Site. A flush level specifies how far the flush should propagate. Currently available flush levels are:

DDS_FLUSH_TO_NOWHERE—Don't flush

DDS_FLUSH_TO_CCS—Flush to Consistency Control Site ("CCS")

DDS_FLUSH_TO_SITE_DISK—First DDS cache module 20 with disk cache

DDS_FLUSH_TO_SITE_STABLE_RAM—First DDS cache module 20 with stable RAM

DDS_FLUSH_TO_SERVER_DISK—Flush all the way

A basic concept of DDS is that DDS projects the source file system at the DDS Server Terminator Site into distant DDS cache modules 20. Consequently, an image of data present in an upstream DDS cache buffer is identical to that in an internal file system buffer at the DDS Server Terminator Site. After a write operation modifies a file system buffer (either local or remote), performance is enhanced if the buffer is asynchronously written to the server's disk at the DDS Server Terminator Site. However, file modifications are safeguarded when they're synchronously written to disk or some other form of stable storage. Flush levels allow both the client and the DDS Server Terminator Site to express their level of paranoia regarding file consistency. The most paranoid of the client and the DDS Server Terminator Site prevails.

DDS_FSCTL—DDS_FSCTL implements various file system control operations. These various file system control operations include:

fs_sync—Commands all downstream DDS cache modules 20 to flush all modified file data from this DDS cache module 20 and this file or file system to whatever level is specified by the flush level parameter.

fs_ping—Pings for the status of specified file systems at downstream DDS cache modules 20. Usually, the fs_ping request specifies all file systems currently being accessed through downstream DDS cache modules 20 regardless of the file system's origin server. Downstream DDS cache modules 20 respond immediately with status indications for each specified file system.

Upstream DDS cache modules 20 use fs_ping (often referred to as a fast ping) to detect, within a few seconds, partitioning events that isolate DDS cache modules 20 from remote file systems. Fast ping rates (typically set from 500 to 3000 milliseconds) are specified as mount parameters when each file system is mounted. For a set of file systems accessed through the same downstream DDS cache module 20, the most aggressive rate determines the fast ping rate for that DDS cache module 20.

fs_callback—Pings the root of the specified file system at the next downstream DDS cache module 20. The downstream DDS cache module 20 doesn't respond until the timeout period (specified in the request, typically 5 to 30 minutes) expires or a consistency event occurs (on any file in the specified file system). Occurrence of a consistency event requires that a cached file image at the upstream DDS cache module 20 (and DDS cache modules 20 further upstream) be recalled or invalidated. Upstream DDS cache modules 20 use fs_callback (often referred to as a slow ping) to register with the downstream DDS cache module 20 and provide a means for the delivery of asynchronous notifications.

When a slow ping is received, it is possible that multiple notifications are queued and waiting to be forwarded upstream. To handle such events expeditiously, the slow ping response can transmit multiple notifications.

The three preceding file system control operations provide the functionality required to ensure the integrity of file modifications, to implement cache consistency, and to quickly detect network partition events that compromise cache consistency.

The DDS protocol facilitates efficient transfers by allowing a single DDS_LOAD or DDS_FLUSH request to specify an array of file segments, each ranging in size up to 4 gigabytes, as targets of the request.

DDS_LOAD and DDS_FLUSH requests include flags that indicate whether the requesting DDS cache module 20 shares memory (DDS_LOAD_COMMON_MEMORY) or disk (DDS_LOAD_COMMON_DISK) with the downstream DDS cache module 20. Whenever data is being passed between DDS cache modules 20 with a common memory, pointers to the data are returned rather than the data itself.

A distributed consistency mechanism, an integral component of the DDS protocol and its implementation, enables a file's consistency control site (CCS—only exists when there's a concurrent write sharing condition present) to dynamically relocate itself as necessary ensuring that it is always positioned as far upstream from the DDS Server Terminator Site as possible but still able to monitor and coordinate all file writing operations.

The DDS protocol endeavors, with a minimum number of operations, to provide all the functions described above, and to thereby implement a superset of the functionality provided by all remote file access protocols. The protocol employs discriminated unions to virtualize the file object metadata that flows through and is cached within the DDS layer. Metadata is represented in its native format, and a discriminator identifies the format whenever the metadata is referenced by a client intercept routine 42 in the course of responding to a file access request. This virtualization of metadata is the means that enables DDS to transparently service file access requests from unmodified client workstations regardless of the homogeneity/heterogeneity of the client with respect to the origin file server.

For example, in the process of responding to an NFS request, the NFS client intercept routine 42 must access the file's metadata. When the discriminator identifies the metadata format as NFS or UFS, an NFS client intercept routine ("CIR") can easily interpret the metadata and generate its response. However, when the metadata format is NTFS, an NFS CIR requires the services of an NTFS to UFS translation module in order to respond to the request.

DDS Domain Hierarchies

U.S. Pat. No. 6,847,968 B2 (the '968 patent") discloses the methods employed by DDS cache modules 20 to organize themselves into a hierarchy of domains. The '968 patent is hereby incorporated by reference as though fully set forth here.

FIG. 2 illustrates a DDS virtual file server for Inca Technology. As depicted, an inca domain 102 contains an eng domain 112, a sales domain 114, a corp domain 116 and a mrkt domain 118. The eng domain 112 is non-atomic, which means it contains other domains (sub-domains). In this case the sub-domains are a bob domain 122, a joe domain 124, a pat domain 126, and a svrail domain 128. Three of these domains are atomic domains: the bob domain 122, joe domain 124 and pat domain 126 are all file servers, but svrail domain 128 is a non-atomic domain. The sales domain 114, also an atomic domain, consists of the resources being exported by a single file server. These resources include the exported file system 32A, the exported file system 32B and the exported file system 32C.

FIG. 3 illustrates a user's view of the inca domain 102. In this illustration the user is employing Microsoft's Explorer program to navigate through his computer's file space. Note that the DDS global file system has been mapped (connected to) the host computer's X: drive. As depicted, the X: drive contains two folders: inca_mail and Internet. inca_mail contains a private namespace and users must have the proper credentials to open that folder and view its contents. However, Internet is a public namespace and is open to all users.

Internet contains two top level domains: com and edu. The com directory contains cnn, hp, ibm, and inca. And, finally, the inca directory contains the inca domain tree depicted in FIG. 2. The cnn, hp, ibm, and inca directories are each the root of a company's domain tree. As FIG. 3 illustrates, when a domain tree root directory is opened (inca, in this case), the next level sub-domains (corp, eng, marketing, sales) appear.

Comparing FIG. 2's inca domain 102 with the inca folder in FIG. 3 clarifies the relationship between domains and folders: they are essentially the same thing. They are both resource containers that may recursively contain other resource containers and/or resource objects. A folder is a visual representation for a domain, and there may be other representations.

For example, the visual representation for a company's domain tree might be the corporate icon (with the well known filename logo.icon stored in the root directory of the domain tree).

FIG. 3 also depicts how DDS binds the shared resources of several companies (cnn, hp, ibm, and inca) into a single namespace enabling a user to seamlessly navigate across company boundaries.

The DDS namespace consists of two layers:

Filesystem Namespace—namespace defined by individual exported file systems. This layer is defined by the file systems (UFS, NTFS, EXT2FS, . . . ) containing the resource objects being exported through DDS.

Network Namespace—namespace consisting of DDS domain names. These names can usually be converted to an ip address using industry standard name resolution services such as domain name system ("DNS").

The Network Namespace ties together the disjunct namespaces of all the individual exported file systems to create a single namespace. DDS employs the existing network name resolution infrastructure to construct the Network Namespace. This results in the binding of exported file systems into the reference framework with which users and system administrators are already familiar.

FIG. 3 depicts the com directory as containing only four sub-directories. In reality, the com directory would contain the root directories of millions of company level domain trees. A single DDS virtual file server, encompassing the complete Internet namespace (gov, org, edu, mil, . . . ) and multiple private namespaces, may encompass hundreds, or even thousands, of petabytes.

This massive amount of data demands improved mechanisms for navigating through the global file system's namespace and for locating content of interest. Obviously, valuable content that cannot be located is actually valueless.

DDS—a Step Beyond the Internet

The Internet as it exists today is an instance of a read only (mostly?) distributed file system on the same order of magnitude as what the DDS global file system will become. Today, Internet users routinely employ search engines to locate content of interest. These search engines appear to work quite well, but one should consider that users generally aren't aware of relevant content that a search fails to reveal.

The DDS global file system requires a search mechanism substantially faster and more efficient than the currently deployed Internet search engines. Recognize that DDS provides a file access service, complete with consistency guarantees. The Internet, by comparison, is an electronic distribution system for published content. Its content, once published, is unlikely to be modified. Furthermore, when an object is modified, a generous "grace period" is acceptable to allow the new content to migrate to distant access points (web proxy cache sites).

Even after most proxy cache sites have loaded the latest version of an object, it may be hours or even days before a web crawler fetches a copy to feed into an indexing engine. So, new content (and modifications to existing content) may not show up in search results for several days.

In contrast, the DDS global file system supports collaboration between individuals and groups. Whenever a document is created or modified, other users often need to be aware of the changes as quickly as possible. This gives rise to a requirement that DDS, to the maximum extent possible, index new and modified content in real time such that a search performed a few seconds after the creation of a new document will locate that document if it does, in fact, satisfy the criteria of the search.

DDS provides the functionally required to enable unmodified industry standard workstations to access remote files using their native CIFS or NFS implementations. DDS virtual file servers receive NFS or CIFS requests and service them from cached data when possible and, when valid cached data is not present, DDS issues requests directed towards origin file servers to fetch the requested data.

Although the DDS protocol is highly streamlined and simplified in comparison with CIFS and NFS, it provides essentially the same capabilities. After all, the DDS protocol is designed to enable client access to files residing on very remote file servers. DDS implements the functionality provided by the file system APIs provided by Linux, Unix, Windows, and other major operating systems.

Using a DDS, NFS, CIFS, UFS, NTFS . . . API, an application establishes a connection to a content object through a series of operations:

Connect to a directory,
Enumerate the directory's contents,
Connect to the target object or to a directory believed to contain the target:
    If connected to the target object: DONE.
    If a sub-directory appears to contain the target object: GOTO Bullet 2.

Using the preceding method, a user can laboriously navigate throughout a file system and explore its content. However, discovering content by scanning directories becomes very inadequate when individual file systems encompass hundreds or thousands of petabytes of data. For such large file systems this method becomes unviable because users just don't live long enough. For large file systems, users (and processes) require more powerful methods for locating content which enables them to quickly and efficiently establish connections to objects of possible interest.

For the Internet, the problem of searching the content of large files systems has already been addressed. Internet search engines accept user's queries and, in general, respond by providing the user with links to Internet objects that appear to contain something which meet a query's criteria. The user then uses the links to easily connect to objects of potential interest so their content may be perused and a final user determination made as to their relevance.

It is noteworthy that Internet search engines actually represent only the most recent instance of at least three (3) successive generations of computer search engines which provide content searching:

Dedicated Mainframe Systems
The early mainframe search engines (Dialog, Nexus, Lexus . . . ) indexed data residing on storage directly connected to the system hosting the search service. Users at terminals (both local to and remote from the mainframe) queried the system using a very structured Boolean syntax.
Software Applications
Verity, Lextek . . . .
Internet Search Engines
Lycos, Alta Vista, Magellan, Inktomi, Google . . . .
Content based retrieval systems (search engines) are generally implemented as two distinct sets of applications:
Index generation applications, and
Retrieval applications.

Index generation is performed once on new (or modified) content, and the resultant new or updated indices are subsequently used by retrieval applications in responding to queries. Traditionally, content indexing systems, e.g., full text indexing, employ batch processing to index document collections. Dialog, one of the first mainframe based commercial full text retrieval systems, used nighttime hours for generating an inverted file which indexed its document collections, and during daytime hours provided online document search and retrieval services.

Presently, search engines continue to generate their inverted index structures in batch mode. Internet Web crawlers prowl sites, discover new content, and ship the new content back to index generation sites (which are usually sites also hosting search engines). New content, continuously flowing in from web crawlers, accumulate at the indexing sites. Eventually, the accumulated new content exceeds a threshold thereby causing it to be forwarded to an indexing engine. The indexing engine processes the new content, extracting and sorting index terms, and then merging the new terms into an inverted file. When invoked, the indexing engine processes all the accumulated new content in a single batch operation.

Although search engine technology has changed over the last thirty-five (35) years progressing from mainframe computer implementations to local area network ("LAN") implementations, and then from LAN implementations to wide area network ("WAN") implementations, the indexing component still retains its lineage: indexing is still performed as a batch mode process.

Definition of Terms
There appears to be no consensus about how terms associated with full text retrieval are used. Therefore, to avoid ambiguity some definitions for full text retrieval terms appear below:

Document—An object (file, record, document) within a collection associated with an accession number.

Accession number—A number, often assigned by the retrieval system's index generation software, which uniquely identifies a document within a collection.

Linear file—A collection of documents, concatenated together, often ordered by accession number.

Linear file index—An index into the linear file. Typically, each record in the linear file index consists of an accession number and a pointer to the associated document. In traditional full text retrieval systems such as Dialog, the pointer is a byte offset into the linear file. In Web based full text retrieval systems, the pointer may be a universal resource locator ("URL"). Records within this file are sorted by accession number.

Index term—A word or phrase extracted from a document during the parsing phase of the index generation process.

Inverted file entry—An index term followed by a pointer to a specific occurrence of the index term within a specific document.

Inverted file record—An index term followed by inverted file entries pointing to each occurrence of the index term within a document collection. The inverted file entries are ordered by <object id, position within document>.

Inverted file—The complete set of inverted file records associated with a document collection.
Inverted file records may be alphabetically sorted by index term. With Web based full text retrieval systems, the boundary between document collections has blurred. Distinguishing features of various document collections might be nothing more than that all the documents within a collection were indexed as a batch.
Individual documents might not be contained within a linear file; they might be geographically scattered about the Web and URLs within linear file index records provide links to these documents.

Inverted file index—An index into the inverted file. Typically, each record in the inverted file index consists of an index term and a pointer (byte offset) to the index term record in the inverted file.
Records within this file are alphabetically sorted by index term.

In some full text retrieval implementations, inverted file records are actually files. In which case, "inverted file", as defined above, refers to the set of inverted files. And, in which case, there is no inverted file index since the containing file system provides the indexing required to locate an inverted file record.

Although indexing and retrieval isn't the first thing that comes to mind when "file system" is mentioned, file systems do provide fairly complete name based (as opposed to content based) indexing capabilities. When an object is created, a new entry is created in a parent directory. The entry typically contains the object's name and a link to the object's attributes, which are stored within an inode (or equivalent). One of the inode's attributes is an extent map specifying the device addresses (usually expressed as disk block numbers) where the object itself (the object's data) is stored within the file system.

File systems generally use a hierarchical indexing structure that facilitates rapidly adding new entries and removing deleted entries. file system performance directly impacts overall system performance, so the speed at which entries can be created, deleted, and looked up has been a force that has molded all current file systems. In particular, name based indexing, which is fairly anemic when contrasted against content based indexing, is employed by all commonly deployed file systems.

File system developers have consistently and uniformly concluded that file system performance requirements exclude considering content based indexing. They've opted for speed over heavyweight indexing.

However, the file systems landscape has changed considerably over forty years. Consider the following:
Virtualized global file systems encompassing hundreds of petabytes are on the horizon if they are not already here, e.g. the World Wide Web.
These virtual file servers will consist of thousands of individual systems.
Individual systems may have very substantial physical resources:
Multiple CPUs, 4 Ghz and faster, 32 or 64 bit,
2 to 64 gigabytes of main memory,
1 to 1000 terabytes of disk memory,
Multiple GigE or 10 GigE network connections.

Incorporating a full text search capability into existing file system APIs as seamlessly as possible provides both users and processes with enhanced capabilities for locating, identifying and establishing connections based upon file content.

BRIEF SUMMARY

An object of the present disclosure is to integrate a search capability into standard file system APIs such that existing programs, with little or no modifications, can transparently locate and discover content as an integral step in the connection establishment process.

Another object of the present disclosure is to provide a highly scalable distributed indexing capability.

Another object of the present disclosure is to provide a highly scalable distributed searching capability.

Another object of the present disclosure is to facilitate the extremely rapid indexing of new and modified objects so that these objects can be located based on their current content.

Another object of the present disclosure is to provide a method for generating a global scope object identifier which uniquely identifies an object contained within a global file system.

Another object of the present disclosure is to employ global scope object identifiers as accession numbers (see the preceding Definition of Terms) for objects indexed by a content retrieval system, allowing the inverted files generated in various sub-domains to be merged into a single composite inverted file.

Another object of the present disclosure is to distribute the functionality of a content retrieval system (such as full text retrieval) throughout the nodes of a global distributed file system such that generating (indexing) and manipulating (retrieving) of index terms is performed "close" to the content.

Another object of the present disclosure is to provide a means by which, for any given global scope object identifier, the object system (as in file system) containing the associated object can be quickly located even when the object system is frequently un-mounted from one DDS object server and mounted on another such that it is essentially a wandering object system.

Another object of the present disclosure is to provide an extensible means by which the icons used in a graphical file management tool (such as Windows Explorer) to represent various domains in a global file system may be defined by an administrator for that domain.

Briefly, one aspect of the present disclosure is a method for incrementally indexing information contained in files within a distributed file system residing upon a virtual file server assembled by integrating a plurality of file servers. The indexing method includes:
a. upon closing one of the files of the distributed file system after information contained in the file being closed has been changed:
  i. parsing the information contained in the file; and
  ii. extracting inverted index entries from the parsed information;
b. sorting the inverted index entries; and
c. merging the sorted inverted index entries into inverted file records of an inverted file that is associated with content of the distributed file system.

Another aspect of the present disclosure includes methods for ensuring that each inverted file entry uniquely specifies the source of the content identified by the inverted file entry, e.g. the particular file within a particular file system. The disclosed methods include generating a unique global object system id for a file system included in a distributed file system residing on a virtual file server by concatenating:
a. the file system's origin file server's ip address; and
b. the origin file server's then current time.

The methods further include ensuring the global object system id's uniqueness by registering it with a provider locator service. Lastly, the methods for ensuring that each inverted file entry uniquely specifies the content's source include concatenating:
a. the registered global object system id; and
b. the object's object id.

These and other features, objects and advantages will be understood or apparent to those of ordinary skill in the art from the following detailed description of the preferred embodiment as illustrated in the various drawing figures.

DETAILED DESCRIPTION

Embedding a full text search engine into a distributed file system to automatically index the file system's content requires that the search engine:
Integrate seamlessly into virtual file server frameworks.
Be capable of making new content immediately searchable, i.e. obviate a need to perform a separate batch process to index the file system's content.
Be highly scalable—during both index generation and retrieval operations.

Consequently, integrating a content based retrieval system into a distributed file system breaks down into separate tasks of integrating an index generation capability and integrating a content retrieval capability into the distributed file system.
Integrating Index Generation New content becomes instantly searchable when content indexing is integrated directly into the main code path of the software routines implementing a distributed file system. However, the sheer volume of information stored in large distributed file systems demands more powerful indexing capabilities. Fortunately, the resources are now available to provide very robust indexing at the demanding speeds required by file systems. However, content based indexing requires such a substantial amount of additional processing that speed and efficiency must be the prime directives shaping its inclusion in a distributed file system. In particular, speed and efficiency dictates that inverted file index generation should be performed at a site as close to the object as possible, preferably at the same site as where the object is stored.

Figure 4:
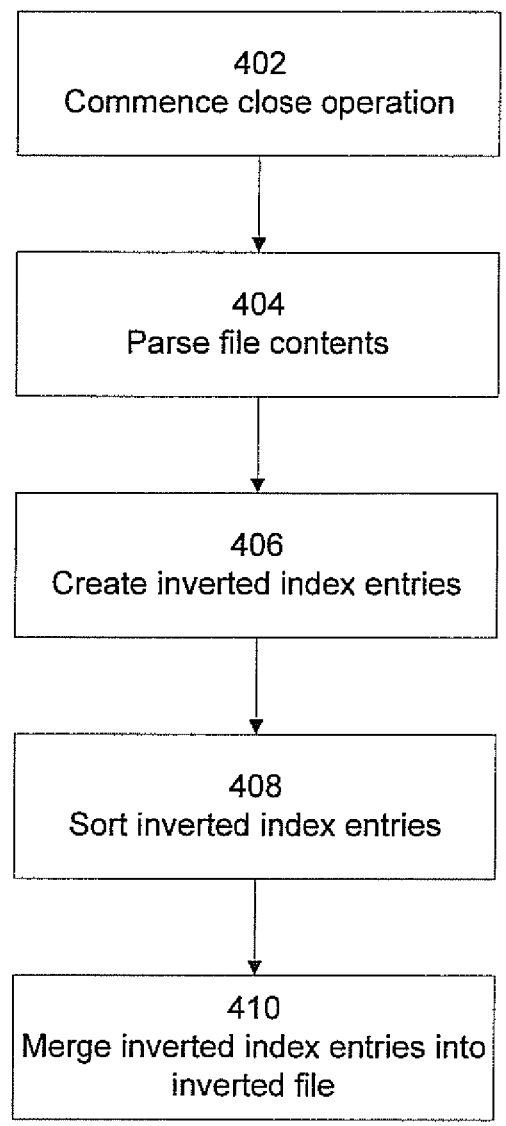
FIG. 4 is a flowchart of one embodiment of a method for incrementally indexing information contained in files according to the present invention.

A preferred method by which new content becomes immediately searchable is shown in FIG. 4:

1. Shortly after the last byte of data has been written to a newly created (or modified) object, the client process (creating the object) invokes the file system's API close routine at step 402. In traditional file systems (hierarchical name based indexing), only a few attribute updates (file size, modification time) are required to "finalize" some of the attributes associated with the new object. These updates are performed as usual.

2. Then, at step 404 the new object is immediately parsed. Potentially, up to every word (excepting "junk" words like and, or, the, . . . ) is extracted and converted into an inverted index entry at step 406. As discussed further below, this may include creating from the parsed information a global scope object id which uniquely specifies an object contained within the distributed file system.

The parsing phase generates a number of index term buckets. Each bucket is labeled with an index term extracted from the object, and the bucket's contents are a variable number of inverted index entries. For example, if the word "computer" occurred three times in the object, there would be three entries in a bucket labeled "computer". Each entry in the index term buckets identifies where the particular word on the bucket label, e.g. "computer," occurs within the object.

The format of an inverted index entry varies between different full text indexing systems. Described most generally, an inverted index entry has the form <object id, offset within the object> which typically takes the form <object id, field, sentence, word>. For example, if "computer" occurred as the seventh word in the second sentence of the abstract field (where abstract field equals 121), then its entry would be <236741.44127366, 121, 2, 7>. (Obviously, the new object has been assigned an identifier of "236741.44127366".)

3. After the parsing phase completes, at step 408 the inverted index entries in each bucket are sorted.

4. After sorting, at step 410 the inverted index entries contained in the index term buckets are merged into the inverted file. For example, the three sorted entries in the "computer" bucket are merged into the "computer" inverted file record, which contains the sorted set of inverted index entries that specifically identify each occurrence of "computer" throughout the complete set of objects that had been previously indexed. As discussed herein (see Differential Inverted File Updates, below), the merger may be accomplished by differencing the sorted inverted index entries against the inverted index entries for a prior version of the file to produce a difference file containing inverted index entries that indicate additions and deletions to the file, and then using the inverted index entries of the difference file to update the inverted file that is associated with the content of the distributed file system.

5. After the merge completes, the object is fully indexed and can be located using content based searches.

6. The close operation may return immediately after initiating a new thread to perform the full text indexing of the new object, or it may return only after the full text indexing has completed. In the latter case, the application that just created (or modified) the object is assured that the object is completely searchable from the moment the close function returns.

The preceding process updates the inverted file incrementally, one object at a time. This is a departure from the batch mode updates (where thousands of objects are typically processed at a time) that are usually employed by today's full text retrieval systems. While updating the inverted file incrementally may not be new, its integration into a file system's close operation departs significantly from known file system practice.

Index Generation Scalability Issues

The process of generating an index for a collection of objects requires that every object be scanned and parsed (index terms extracted). Following the parsing phase, the inverted index entries are sorted and merged into the inverted file. This process is both cpu intensive and i/o intensive.

As enumerated above, the full text indexing of a new object may require two, three, or even four orders of magnitude more processing than the traditional directory hierarchy style indexing. This is a marked increase in the processing required during a file system's close operation. Therefore, full text indexing must be invoked judiciously. There may be many instances where it's known beforehand that full text indexing isn't warranted for certain types of objects, e.g. files containing pictures or images.

The invocation of full text indexing during a file system's close operation is optional and is controlled by either a flag bit parameter of the close function call and/or the definition of a new file system API: close_and_index.

A flag bit parameter to the close or close_and_index functions determines whether the full text indexing is completed before the file system's close operation returns to its caller.

Differential Inverted File Updates

Another way to increase index generation scalability is to reduce the amount of work required to update the indices for a file following its modification.

Consider a book on "computer networks" being written by several authors. Assume each author is writing a chapter (in a separate file) and all authors are interested in changes to any chapter being visible to all of them.

After a particular co-author modifies Chapter 7 and the close_and_index routine is called, the following sequence of operations occurs:

1. The chapter is parsed and chap7.rev11.if, an inverted file for the eleventh revision of Chapter 7, is generated.
2. chap7.rev11.if is differenced against chap7.rev10.if to generate the difference file chap7.diff.10-11. This file indicates which terms were added, deleted, or moved during the last editing session.
3. A book.if composite inverted file, containing the merged full text indices for the complete book, is updated by applying all differences listed in chap7.diff.10-11.

Without a differential update capability, the sequence would be:

1. The chapter is parsed and chap7.rev11.if, an inverted file for the eleventh revision of Chapter 7, is generated.
2. The book.if composite inverted file, containing the merged full text indices for the complete book, is created by merging the latest versions of each chapX.revX.if.

The advantage of differential updates becomes apparent when the composite document collection consists of millions of documents. The task of selectively updating book.if in this case is substantially less than the effort required to merge millions of xxxx.if files.

Integrating a Content Retrieval Capability

A preferred method for seamlessly integrating a full text search capability into the DDS virtual file server framework is to incorporate a content retrieval capability into DDS and to extend DDS's verb set (distributed file system API) to make this new capability accessible to DDS clients.

In addition to the standard file system verbs (open, close, read, write, link, rename, . . . ), a new verb is added: search. DDS clients may invoke a full text retrieval mechanism, the preferred content retrieval capability, by calling upon the new search file system API routine.

The response to a successful search request is a set of inverted index entries. As described previously, an inverted index entry generally has the form <object id, offset within the object> which typically takes the form <object id, field, sentence, word>. The object id of an inverted index entry identifies an object, and the other information within an inverted index entry points to a location within the object where the index term associated with the entry occurred.

An object id (accession number) may have either local or global scope:

Local scope object ids uniquely identify objects within the domains that contain the objects. A local scope object id is not valid and cannot be interpreted outside of its domain. However, a local scope object id may be used by foreign client processes (operating outside of the local scope) as an opaque handle for the object it identifies. A foreign client process may present an opaque handle to a process executing within the local scope and request that the local process establish a connection to the object.

However, when a global domain contains millions of subdomains, it is not always readily apparent which subdomain is the progenitor of a particular local scope object id.

Global scope object ids uniquely identify objects throughout a global domain, and are universally valid. A very important property of universal validity is that all of the inverted files (created mostly in sub-domain leaf nodes) of the global domain comprise a single distributed inverted file. This has the following implications:

The actual execution of a global search may be performed in the individual sub-domains and the results from each sub-domain may be merged into a single response.

The inverted files generated in sub-domains may be loaded by the parent domain and merged into a single composite inverted file. After the merge, searches executed in the parent domain using this single composite inverted file will yield all relevant content contained in the parent domain and all of its sub-domains.

Global Scope Object ID

Indexing content within objects of a distributed file system requires that the object id included in each inverted file entry uniquely specify the source of the content identified by the inverted file entry, e.g. the particular file within a particular file system. Ensuring the existence of unique object ids globally throughout an entire distributed file system requires that the distributed file system, at least, maintain a registry of unique identifiers, e.g. unique file system identifiers. Basically two approaches exist for registering unique identifiers:

a proposed identifier is generated and submitted to the registry which either accepts or rejects the identifier.

the registry generates and issues a unique identifier in response to a request therefor.

Currently, file systems for Unix, Solaris and Linux are capable of generating object identifiers that are essentially unique within a particular file system. A preferred method for generating global scope object ids is to prepend to this particular type of file system object id a globally unique object system id. Accordingly, a global scope object id which uniquely identifies an object throughout a global domain preferably has the following structure:

global scope object id ::=<global object system id><object id>

Global Object System ID

A preferred global object system id is a twelve byte number generated when a file system (the most prevalent type of object system) is created by, for example, either a newfs or mkfs Unix or Solaris command. The first four bytes of the global object system id are preferably the origin file server's ip address, and the next eight bytes are preferably a high resolution time stamp (microsecond or better) provided by the origin file server which reflects the current time.

The first step in creating a new file system is to append the current time (high resolution mode: 8 bytes) to four bytes representing the origin file server's ip address and use the resulting twelve byte number as a candidate for the global object system id for the file system about to be created. Next, an attempt is made to register the candidate global object system id with a DDS provider locator service (described below). If the global object system id is already in use, the locator service responds with an error.

When the DDS provider locator service refuses to register a global object system id because it is not unique, the origin file server once again appends the current time to four bytes representing the origin file server's ip address. Because the high resolution mode current time being appended to the origin file server's ip address necessarily is for a later time, the subsequently generated global object system id necessarily differs from that rejected by the DDS provider locator service. Then this new and different global object system id is submitted for registration with the DDS provider locator service. This iterative process repeats until the origin file server successfully registers a global object system id with the DDS provider locator service.

Having successfully registered a global object system id with the DDS provider locator service, the origin file server proceeds with creating the new file system. After the file system is created, the registered global object system id is entered into the file system superblock, thereby assigning a unique and permanent identifier to the file system.

It is readily apparent to those skilled in the relevant art that there exist many other techniques which may be employed for generating and registering a unique global object system id.

Object ID

An object id is a number created by a provider for the purpose of uniquely identifying an object. An object id may be temporary or it may be permanent, and some providers generate both types.

For example, on a Solaris file server a local process might open the same file on two different occasions and receive two different file descriptors: "11" the first time and "7" the second time. (A file descriptor is one type of object id.)

However, a remote NFS client accessing the same file would receive a file handle that uniquely identified the file forever. An NFS client may present a file handle that it received ten years ago and hasn't used since back to the file server and that server must either establish a connection with the original file or respond with an error indicating that the file handle is no longer valid. (A file handle is another type of object id.)

A method commonly used by Unix based NFS file servers to create a permanent file id is to concatenate two 32 bit numbers, the inode number and the inode generation number, to create a 64 bit file id. Since each time an inode is assigned to a new file its generation number is incremented, an inode would have to be re-used over 4 billion times before a file id of this type could repeat. These 64 bit file ids are essentially good forever.

DDS Provider Locator Service

The locator service provides a means of dynamically re-routing DDS network traffic such that traffic to a specific file follows that file as the file system (holding the file) is repeatedly un-mounted from one file server and then mounted on another server.

Whenever a new file system is mounted or un-mounted, a message is sent to the DDS provider locator service informing it that "file_system_X" (a twelve byte global object system id) is being mounted (un-mounted) on "host_X" (a fully qualified domain name that can be resolved to an ip address).

Combining a method to create global object system ids (such as the one described above) with a method of determining which file server currently has a specified file (object) system mounted effectively decouples an object id from the server that created it.

Windows, Linux and Unix file servers generate local scope object ids which can only be interpreted by the servers that generated them. The method described here enables file servers to interpret the object ids for files contained within all currently mounted file systems regardless of which file server originally generated the object id.

Consider a DDS client with a ten year old file handle. Suppose that the file associated with the old file handle resided within a file system on a disk drive that had recently been shipped to a distant location. The disk is subsequently installed on a DDS configured file server and that server mounts the file system. Then, when the DDS client attempts to read the file, the "old server" responds with an error indicating "no such file system". This causes the client system to query the locator service, requesting the name of the server currently providing access to "file_system_X". The client then re-directs the read request towards the "new server".

The combination of global object system ids and the DDS provider locator service enables object system migration without client disruption. This capability facilitates and greatly simplifies implementing failover, load balancing, archival, and disaster recovery type products.

Searching Using an Existing File System's API

The preferred method incorporates a search capability in a way that enables unmodified application programs to employ the new capability. The following example illustrates how this is accomplished:

1. On a hal workstation 132, a Windows 2000 workstation, an application program executes the system call:

```
CreateDirectory( lpPathName,
    lpSecurityAttributes );
where lpPathName is a pointer to the string:
    "X:\Internet\com\inca\!_Search_Results_!\(computer
    OR PDA) AND network", and
lpSecurityAttributes is a pointer to a
    SECURITY_ATTRIBUTES structure.
```

Both the PathName and the SecurityAttributes parameters conform to the Windows 2000 conventions.

2. The hal workstation 132's X: drive is mapped to a DDS portal (a DDS node on the same LAN segment). Therefore, the Windows 2000 Redirector on the hal workstation 132 generates a CIFS CREATE_DIRECTORY request and dispatches it to the DDS portal. The request contains the lpPathName string as the CIFS DirectoryName request parameter.

3. The request arrives at the DDS portal and is processed by DDS's create directory CIFS CIR. Request processing initially proceeds as normal:
    The Internet directory is opened.
    The com directory is opened.
    The inca directory is opened.

4. However, when the !_Search_Results_! pathname component is encountered, the character string is recognized as a special directory name where the roots of parallel namespaces created by searches of the inca domain 102 are anchored (see Navigable Namespaces for !Search_Results—Parallel Namespaces below).

5. An attempt is made to open the !_Search_Results_! directory, which will exist if prior searches of the inca domain 102 have been performed.

6. The !_Search_Results_! directory is created if it does not already exist.

7. The pathname component following "!_Search_Results_!" is interpreted as a search specification string. The integrated content search mechanism is invoked at this point by DDS's CIFS client intercept routine to search the \Internet\com\inca domain according to the search specification.

8. A directory with the name "(computer OR PDA) AND network" is created within the !_Search_Results_! directory. This directory, the root of the parallel namespace created by the search, contains links to the content within the inca domain 102 that satisfy the search criteria.

9. When a search is performed and no content matches the search specification, an error (NON_EXISTENT_DIRECTORY) may be returned or the search root directory may be created. However, it will be empty; indicating that there were no matches for the query.

Extending the Current File System API

Another method of extending standard file system APIs is to define a new function: the search function. The search function's first parameter is a search specification text string, and the remaining parameters are the same as those of the CreateDirectory function. One of those remaining parameters is the pathname of the domain to be searched.

When a search produces results, a directory is created and it is immediately populated with links to the results. The caller opens the new directory and follows the links within to establish connections to objects that satisfied the search criteria.

Content Retrieval Scalability

An integrated content search capability gives file system clients a powerful new tool for locating content. However, placing this tool within easy reach of users (and there are many users!), creates some major scalability issues.

Given a new search verb, it's imperative that DDS respond to search requests quickly and efficiently. Not only do DDS virtual file servers encompass huge pools of information, but they also support millions of users concurrently. Since thousands of search requests may be in progress simultaneously, searches must be performed relatively quickly and must not excessively burden the network. However, responding to a search request generally places a far heavier burden on a virtual file server's infrastructure than any of the other file access requests a client might submit.

The magnitude of the content retrieval scalability issues completely dwarfs the issues associated with real-time full text indexing.

Consider a single user submitting a search request specifying /dds/Internet/com as the root of the subtree to be searched:

Since this is a request to search all content contained by all of the organizational domain trees plugged into the /dds/Internet/com domain, it must be forwarded to each of the millions of domain trees populating /dds/Internet/com.

Many organizational domain trees (such as /dds/Internet/com/boeing) are, in themselves, enormous geographically distributed domains consisting of thousands of industry standard file servers.

There are likely to be tens of thousands of such search requests in process simultaneously.

Clearly, effectively addressing the content retrieval scalability issues is an enormous task. Accordingly, a variety of methods, each of which focuses on some aspect of retrieval scalability, are employed to implement fast, responsive and highly scalable retrieval capabilities. Each of these various methods can be categorized by its basic approach to the problem.

The methods, grouped by category, are:
Methods to increase search engine scalability:
  Hierarchically distributed search engines
  Inverted file interoperability
  Inverted file caching
  Managed consistency:
    Static domains
    Energetic domains
    Delayed consistency
    Selective consistency
Methods to limit the distribution of search requests:
  Public namespace windows
  Domain level access control
  Search request routing
Methods to support public search engines:
  Inverted file forwarding
  Inverted file caching
Methods to create navigable namespaces for search results:
  Attribute extensions
  Parallel namespace resolution
  Namespace Discrimination
  Namespace Coherency The following sections and sub-sections follow the immediately preceding categorization, and provide methods within each category.

Search Engine Scalability

DDS global file systems are organized as domain hierarchies. If a single monolithic search engine were used to implement a global file system's search function, that search engine would be continuously burdened with the processing of every search request generated by all users, and the number of users at any one time might number in the tens of millions. Obviously, this monolithic approach lacks scalability.

Hierarchically Distributed Search Engines

An alternative to a monolithic solution is hierarchically distributed search engines. This approach delegates the responsibility (burden) of performing searches down into the sub-domains. And, each sub-domain may, instead of actually executing any search routines, rely on its sub-domains to provide the search capability for each of its sub-domain's respective resources. In this way delegating search request processing to sub-domains becomes recursive. Atomic domains, leaf nodes which do not contain sub-domains, must either service the request or respond with an error code indicating that this domain does not provide a retrieval capability.

When a domain receives a search request, the domain may:
  process the request directly, or
  forward the request on to each of it's sub-domains, or
  forward the request on to some of it's sub-domains while also processing the request directly for itself and for some of it's sub-domains.

Inverted File Interoperability

When a domain generates a response to a search request, it merges the responses received from its sub-domains (if any) with its own response (if any).

The complete flexibility to execute searches at various levels of the hierarchy and to merge the results derives from the exclusive use of global scope object ids to identify all objects within the namespace.

Inverted File Caching

Inverted files are usually generated in atomic domains (leaf nodes), where most of the content within a global domain resides. Generating indexes in the leaf nodes:
  Keeps a substantial amount of file access traffic from flowing across network links.
  Distributes the indexing burden as widely as possible.

Figure 1:
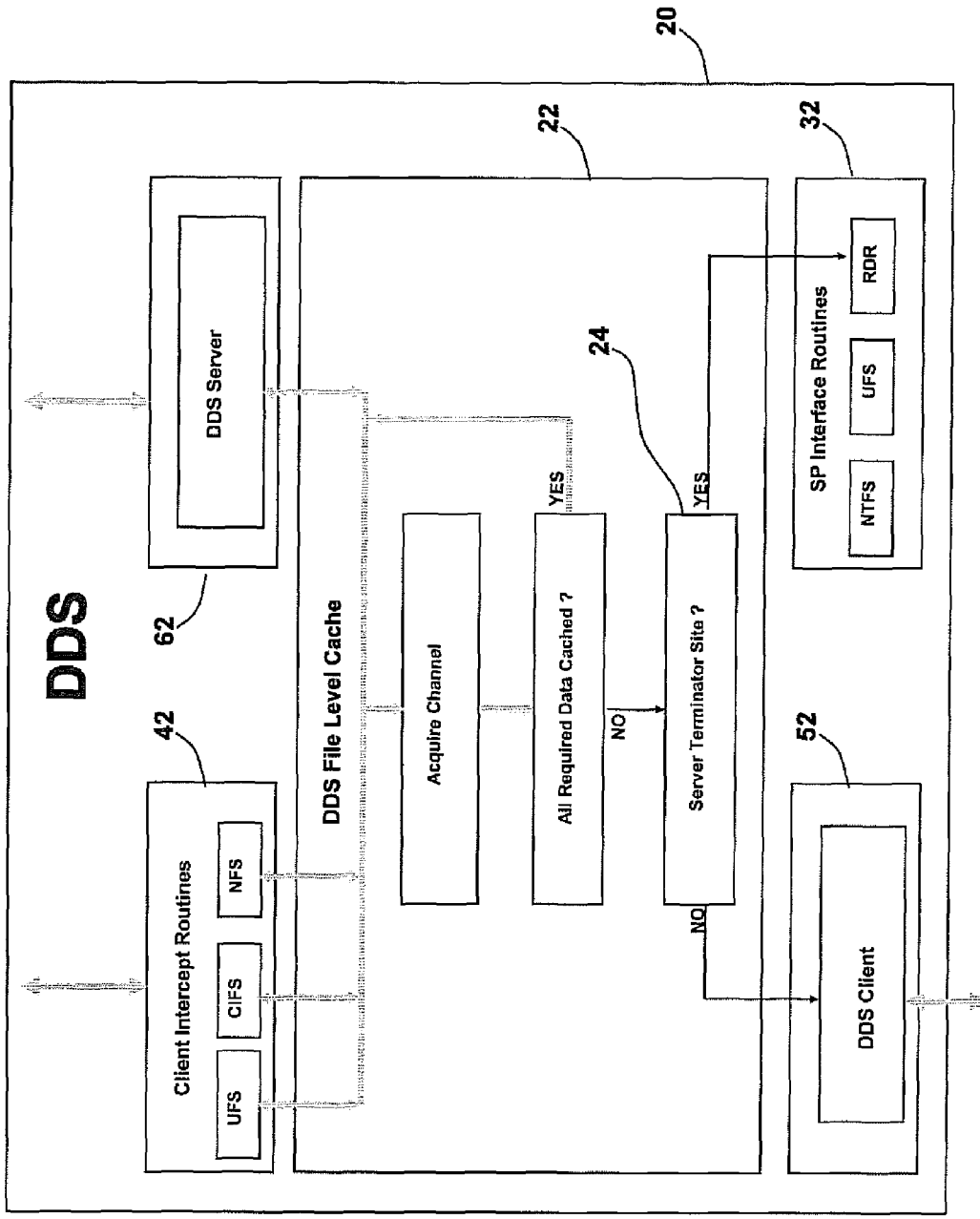
FIG. 1 is a functional type block diagram depicting a DDS cache module.
Figure 2:
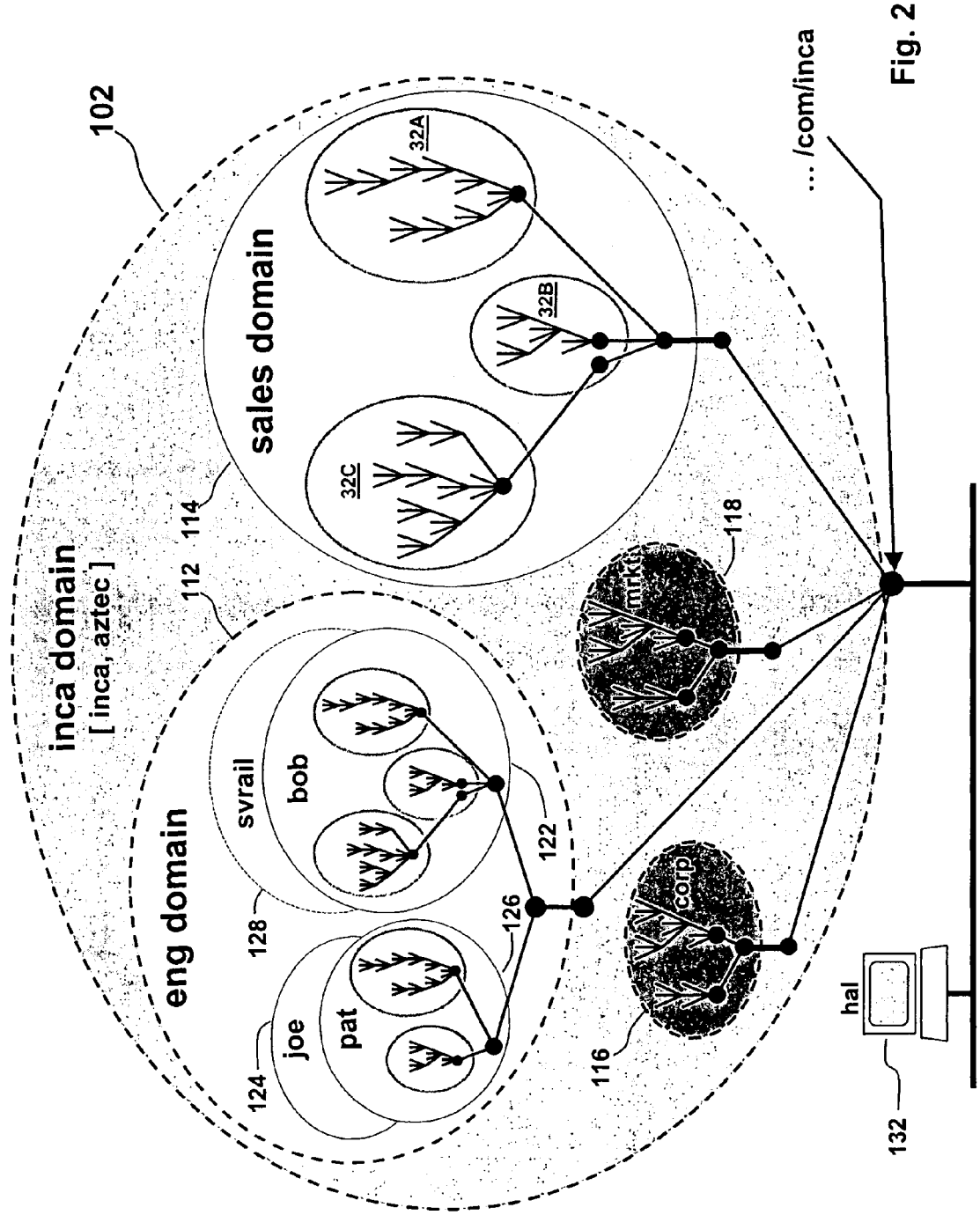
FIG. 2 is a tree diagram depicting several hierarchical domain trees.

When the eng domain 112 in FIG. 2 receives a search request, the search may be directly executed by the eng domain 112, as opposed to forwarding the request on to the joe domain 124, pat domain 126, bob domain 122 and svrail domain 128. The inverted file(s) referenced during the execution of the search request may be local (having been previously pulled from the sub-domains and merged), or they may be remote. In the latter case, DDS's caching mechanism automatically loads images of those portions of each sub-domain's inverted file that are relevant to the searches being executed in the parent domain. However, in this case, the search must be individually executed for each sub-domain and the results must be merged.

Figure 3:
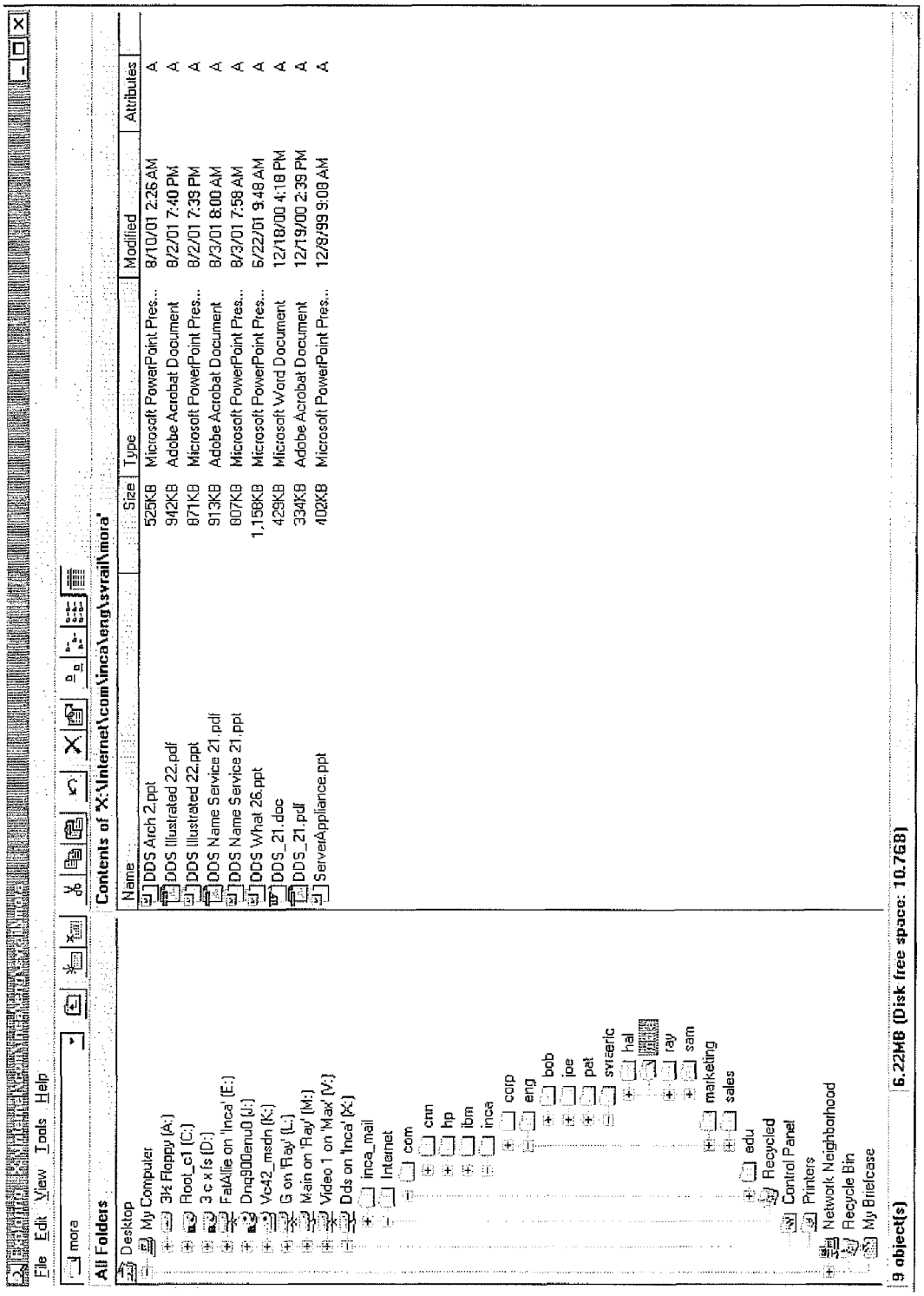
FIG. 3 is a user view display depicting file space for the several hierarchical domain trees illustrated in FIG. 2.
as follows.

Consider the inca domain tree depicted in FIG. 2. Let's step through the processing of a search request. Referring back to FIG. 3, a user decides to search the inca domain 102 for all resources indexed by both "computers" and "networking". The user right clicks on the inca folder and selects a "Search . . . " option which appears in a pop-up menu.

A Search Dialog Box pops-up and the user enters "computers AND networking" and initiates the search, resulting in the following system call being made:

--- search("computers AND networking", "/dds/Internet/com/inca", lpSecurityAttributes);

---

The search system call eventually results in a search request arriving at one of the inca domain portals. (A DDS domain portal is an access point for the domain's resources. It is an ip address where the DDS service provides access to the domain's resources.) This request is handled by a search engine integrated into DDS, which may:
  Process the request directly at this site, referencing a single inverted file that "covers" all objects in this domain and all sub-domains. The single inverted file:
    may have been generated at this site by parsing the content of each sub-domain at this site, or
    may have been generated with the substantial cooperation of the sub-domains, each sub-domain indexing its own data and forwarding the resultant inverted file to this site where it's merged into a single composite inverted file.

Process the request directly at this site, referencing remote inverted files residing in each of the sub-domains. This mode, which employs DDS's caching mechanism to make the relevant parts of remote inverted files appear to be "here", must execute the search individually against each sub-domain's inverted file. The results of the individual searches are then merged into a single response.

Forward the request on to each sub-domain. The responses received back from the sub-domains are merged into a single response.

A \dds\Internet\com\inca\!_Search_Results_!\computers AND networking directory is created for storing links to the objects identified by the search, and a file descriptor for the newly created directory is returned to the caller. Using the returned file descriptor, the caller may read the directory's contents and thereby begin the process of exploring the parallel namespace (created by the search engine, see Navigable Namespaces for Search Results—Parallel Namespaces below) populated with the results of the query.

"!_Search_Results_!" is the root of a parallel namespace dynamically created by the integrated search engine in response to queries. Its purpose is to keep all search results in a separate namespace, with only the portal to that namespace visible to users. When the user lists the contents of the \dds\Internet\com\inca directory, his search results (and those of other users) are not displayed; only the !_Search_Results_! directory is shown. However, the user can easily navigate into the !_Search_Results_! directory to view the results of his prior searches.

A parallel namespace contains a subset of the objects contained in a primary namespace; the subset composed of objects that matched a content retrieval query. For example, "computers AND networking" is the parallel namespace root directory created by the content retrieval query: "computers AND networking". The "computers AND networking" directory is contained within "\dds\Internet\com\inca\!_Search_Results_!", which is the root of all parallel namespaces created by searches of the inca domain 102.

The !_Search_Results_! directory also serves an administrative purpose. Search results are usually automatically deleted on a least recently used basis whenever DDS decides it's time to recover disk space. Keeping all search results under a single directory facilitates recovering disk space.

Managed Consistency

When inverted file caching is employed, the consistency maintained between a source inverted file and its projections into parent domains may be subject to the mechanisms described in this section.

Searches may be executed by referencing remote inverted files contained within sub-domains. DDS's caching mechanism is very effective at making static remote inverted files (data that rarely changes) appear to be local. However, when remote inverted files are modified frequently, the network traffic required to maintain cache consistency (completely current indices) becomes substantial. The following sections present strategies for executing searches when the content is changing at various rates.

Static Domains—Execute Searches in Parent Domains

Static domains contain documents that rarely, if ever, change. For example, the published documents domain of a large corporation might contain employee manuals, company procedures, annual reports, product specifications and other documents that have been the subject of a formal review process. These documents are fairly static; they don't tend to change very often. The inverted files generated from these documents also tend to be static and are excellent candidates for caching in parent domains. The implication here is:

A static domain may be efficiently searched by an engine executing on a parent domain host node.

Referring to FIG. 2, the pat domain 126 and joe domain 124 (sub-domains of the eng domain 112) are static domains. A search executed on the hal workstation 132 (a node of the eng domain 112) could reference remote inverted files generated by, and contained within, the pat domain 126 and joe domain 124. Those segments of the remote inverted files accessed by the search process executing on the hal workstation 132 would be cached locally.

Assuming the availability of cache space, the hal workstation 132's cache would eventually be populated with whatever indices are required to support the type of queries handled by this node. These indices might be a small subset of the complete set of remote inverted files.

Energetic Domains—Execute Searches within the Domain

Energetic domains represent the other end of the spectrum. When a domain's content is constantly changing, the associated inverted file is subject to continuous modifications. These modifications render inverted file caching within parent domains ineffective. So, for domains with volatile content, a good rule is:

An energetic domain is most efficiently searched by an engine executing on a domain host node.

Referring to FIG. 2, the bob domain 122 and svrail domain 128 are both energetic sub-domains of the eng domain 112. A search request received by the hal workstation 132 may be forwarded to the bob domain 122 and svrail domain 128 and then the hal workstation 132 may perform the search for the pat domain 126 and joe domain 124. After all four searches have completed, the hal workstation 132 merges the results into a single response.

Delayed Consistency

Energetic domains may be efficiently searched by remote processes by relaxing the consistency constraints on cached image projections of inverted files. Instead of ensuring that a read request always returns the most current data, the consistency mechanism can be set such that a read request returns data that was current as of an hour ago.

Suppose "computer" is one of the search terms comprising a query. Employing relaxed consistency, when the search engine references the "computer" indices cached at this site, it checks an associated timestamp indicating when the "computer" indices data was last refreshed. New indices are loaded only if the cached image is out of date by more than a specified threshold (e.g. one hour).

Of course, many variations of delayed consistency can be conjured up to capitalize on the fact that, in most instances, a search that discovers all relevant content based on indices generated very recently is sufficient.

Selective Consistency

However, there are situations where collaborative efforts between numbers of individuals (or processes) demand that content modifications be instantly visible to all members. The cost associated with maintaining this level of visibility is substantial, so a mechanism is provided to selectively deliver the higher levels of indexing consistency.

A distributed search routing switch determines where a search is actually executed within a global file system hierarchy. Referring once again to FIG. 2, let's step through the processing of a search request:

1. A search request is received by the hal workstation 132, one of two DDS nodes hosting the eng domain 112. The domain contains:

The joe domain 124 and pat domain 126—static domains. Their cached indices are completely current.

The bob domain 122, and svrail domain 128—energetic domains. Their content is always changing. However, recently modified objects usually comprise only a small fraction of total content. So, with delayed consistency set to one hour, 99.5 percent of the cached images of the bob domain 122's and svrail domain 128's indices are likely to satisfy that level of consistency. (Only modifications made during the last hour will not be reflected in the cached images of the bob domain 122's and svrail domain 128's indices.)

2. The request credentials identify the user (or process) as a principal collaborating on a project contained within the bob domain 122. With respect to the bob domain 122's content, this user wants recent modifications to be as visible as possible.
3. The hal workstation 132 initiates four search threads, each thread targeting a different sub-domain (the pat domain 126, joe domain 124, bob domain 122, and svrail domain 128).
4. Each thread first calls the distributed search routing switch, a software routine that determines whether:
   the search should be executed at this node, or
   the search should be forwarded on to the sub-domain.
5. The distributed search routing switch determines that the threads targeting the two static domains (the pat domain 126, joe domain 124) and the thread targeting the energetic domain in which the user's not particularly interested, i.e. the svrail domain 128, should each invoke the search engine at this node (the hal workstation 132). These three threads will execute the search by referencing the cached inverted file indices of their respective target sub-domains.
6. The distributed search routing switch also determines that the search of the bob domain 122 should be executed directly on the bob domain 122. Completely current indices (bob's inverted files) are to be used for this search because this user wants recent modifications of the project to be instantly reflected in the search results. So, the fourth thread forwards the search query on to the bob domain 122 and waits for the response.
7. Each thread generates a response if any content within its targeted domain matches the query. Each response is a derived set of inverted index entries. The global scope object id (accession number) contained within each entry is a link to an object matching the query. Thus, each response is a set of links to the objects within a sub-domain that were identified by the search thread.
8. The response generated by the hal workstation 132 is patterned after a DDS_CONNECT type response. The response includes the file handle of a new object and the attributes for that object. The new object may be either a directory or a file (as indicated by the attributes). New data fields added to the attributes may indicate the number of hits and/or a relevance weighting.

In this case, the file handle for a directory is returned. When the calling process reads the directory, it will discover three files (named joe, pat, and svrail) and a directory (bob). Each file contains links to sub-domain objects matching the query. The bob domain 122's directory contains a remote file named bob. This file is just like the others except it actually resides on bob domain 122 whereas the other three files reside on the hal workstation 132.

For efficiency reasons, the hal workstation 132 may optionally merge all four files into a single file and then return the file handle for that file instead of returning a directory file handle.

Distribution of Search Requests

A single unrestricted search (the only kind described so far) targeting the com domain would generate a global wave of network traffic. The search request, delivered to the millions of domains plugged into dot_com, would recursively propagate from domains to sub-domains until every node within the com domain had participated in the search.

Obviously, the amount of network activity required to satisfy a single user request is excessive and doesn't scale beyond a relatively limited number of users.

Therefore, several methods may be employed to limit the distribution of search requests targeting public namespaces (such as con, edu, gov, mil, net . . . ). The following subsections present some of these methods.

Public Namespace Windows

Referring back to FIG. 3, the X:\Internet\com directory contains only four entries: cnn, hp, ibm, and inca. These entries represent only a small subset of the registered members of the com domain. But, these entries are the only ones contained in this windowed view of the com public namespace.

DDS employs windowed views for all public namespace directories.

Windowed views, sometimes referred to as just windows or views, limit the scope of search requests to the "user's world". Both implicit and explicit methods are employed to construct views conforming to each user's interest profile.

DDS monitors user activities and creates interest profiles. Window entries are created implicitly from the user interest profiles and explicitly whenever a public namespace directory is accessed.

A user can easily determine his current windowed view by simply listing or displaying the contents of the appropriate public namespace directory. And, a user can easily add or remove entries by right clicking on the directory and selecting either an Add or Remove menu item.

A windowed view has the following properties:
   A view is limited to a maximum number of entries (set by user or administrator).
   An unsuccessful DDS_CONNECT attempt (target not in the current window) creates a new entry in the following manner:
      DNS (or equivalent) is queried for the target's ip address.
      A DDS_CONNECT (to root of domain tree) request is sent to ip address.
      The target responds with the file handle and attributes of domain tree root.
      New entry (a directory named 'target') is created in the windowed view.
   Window entries are maintained on a least recently used (LRU) and timeout basis.
   A window entry may be pinned so that it will not be removed by the LRU or timeout mechanisms.

Domain Level Access Control

Limiting the scope of search to a windowed view drastically reduces the number of nodes participating in a search. However, a huge number of search requests are still likely to be delivered to well known domains.

As with other file system requests, executing a search request may require the user to have a particular authorization level. For example, a search request from a random user received by boeing.com might be forwarded to all next level sub-domains, where it would be rejected by all sub-domains except one: the public.boeing.com sub-domain.

Another user, an American Airlines employee, submits a search request to boeing.com. This request, also forwarded to all sub-domains, is accepted by: aa.customer.boeing.com, marketing.boeing.com, and engineering.boeing.com in addition to public.boeing.com.

Search Request Routing

When a search request arrives at a domain portal, a domain manager may route the request on to specific sub-domains based on the user's identity, credentials and authorization. For example, when boeing.com received the search request from the American Airlines employee, a boeing.com domain manager might route the request on to only aa.customer.boeing.com, the American Airlines customer domain of the Boeing Company's global file system.

Selective routing filters out traffic that would otherwise be loading a domain's infrastructure. And, more importantly, selective routing actively directs the flow of incoming traffic and prevents malicious traffic from being indiscriminately sprayed into sub-domains.

The ability of a domain manager to actively control the flow of incoming traffic is consistent with a DDS principle (set forth in documents identified earlier as being included in this disclosure) that a domain manager is in complete control of its resources. This principle applies to controlling the flow of network traffic within the domain.

Public Search Engines

An enterprise may decide for security (or other reasons) that its domain will not accept any network traffic from unknown sources. Searches will not be performed for anonymous users. However, there may be public object (document) collections scattered throughout the enterprise's domain, and these objects should be searchable and accessible by the public.

Top level enterprise domains may register the inverted files of public object collections with public search engines such as Google, Alta Vista, and Lycos.

Inverted File Forwarding

The registered inverted files may be periodically downloaded to public search engines and merged into composite inverted files, which are the files referenced to satisfy user queries. An individual query may be executed against multiple composite inverted files and the results may be merged into a single response.

The grouping that comprises a composite inverted file is generally an association of some sort. For example, all aviation related companies might be grouped together.

Individual composite inverted files are periodically reloaded and rebuilt, and then brought online, replacing the previous version composite inverted file. The update cycle period is days, weeks, or months depending on the particular group of inverted files.

When the results of a query against several composite inverted files are merged, each inverted file entry contains a global scope object id that can be presented at any DDS portal to establish a connection to the object. Of course, the user must have proper credentials and authorization to actually establish a connection.

Inverted File Caching

Instead of downloading registered inverted files, the inverted files in remote top level enterprise domains may be remotely referenced by public search engines and dynamically cached as they're referenced. The cached indices may often constitute only a small fraction of the full set of indices.

When this is the case, it is more efficient to employ dynamic inverted file caching than to download and merge the complete inverted file.

Navigable Namespaces for Search Results—Parallel Namespaces

When a domain search is executed, a parallel namespace, populated with links to primary namespace objects satisfying the search criteria, is created and the file handle of the root of this namespace is returned to the process that initiated the search. The user (or application) may navigate this new namespace in the same manner used for the primary namespace. For example, a Windows Explorer user may double-click on the icon representing the !_Search_Results_! directory within the \Internet\com\inca folder and the "(computer OR PDA) AND network" folder (and possibly other folders created by previous searches) comes into view. The user may continue double-clicking folders to explore the space and any of the content included within the space.

An individual link, which may be a directory, a symbolic link, a hard link, a global scope object id, or even a URL, has the property that it points towards an object. There are two types of links:

Direct links—a direct link points at an object. A direct link is one reference removed from the target object.

Indirect links—an indirect link points toward an object or object collection. An indirect link points at a container object (such as a directory) containing a link (either direct or indirect) to the target object. An indirect link never points directly at its target. It is always at least two references removed from its target.

Indirect links run parallel to primary namespace links. For every directory link within a parallel namespace there exists a corresponding directory link in the primary namespace.

A search response may be categorized by the types of links it contains:

Direct response—the root of the parallel namespace contains only direct links. There are two forms of a direct response:

The object associated with the returned root file handle is a file containing a set of inverted index entries. The global scope object id contained within each entry is a link to an object matching the query.

This form, referred to as an un-scored direct response, returns a set of inverted index entries. The format of the response does not provide for the return of per entry relevance information. However, the return object is a file and therefore has an associated attribute structure that is included in the DDS_CONNECT response. The attribute structure may be extended to convey the number of hits and/or a relevance score.

This form associates a group score with a response.

The object associated with the returned root file handle is a directory. In this form, the textual names of the directory entries are derived from the global scope object ids extracted from the set of inverted index entries comprising the search results.

The advantage of this form is that individual directory entries have associated attributes, and extensions to these attributes (see Attribute Extensions below) can incorporate the number of hits and/or a relevance score into the search results. This form of direct response, referred to as a scored direct response, conveys additional information enabling the caller to discriminate between the results.

This form associates an individual score to each link within a response. Scored direct responses are usually sorted by relevance.

Indirect response—the root of the parallel namespace contains at least one indirect link. The object associated with the returned root file handle is a directory which may contain file objects and must contain at least one directory object. The significance of each is:

Each file object contains a collection of un-scored links.

Each directory object is a scored link that enables the caller to discriminate between partial results contained within each directory.

Attribute Extensions

An object's attributes convey information about the object such as its size, its creation date, and its owner. Additional attributes may be defined that indicate how the object (or object collection) was scored by a search evaluation routine. By associating these scores with indirect links, the paths to the targets are, in effect, scored. This path scoring greatly facilitates a user's ability to quickly home in on the most relevant content.

Parallel Namespace Resolution

Indirect links are structural elements from which high resolution parallel namespaces may be constructed. The resolution of a parallel namespace is the degree to which the parallel namespace reflects its primary namespace. For example, suppose the hal workstation 132 returned a response containing links to one thousand objects. Consider the various forms the response might take:

The hal workstation 132 may use an un-scored direct response to return one thousand links. Then, it's up to the caller to peruse the associated objects and select the ones of interest.

The hal workstation 132 may use a scored direct response to return a collection of links sorted by relevance. Again, it's up to the caller to peruse and select. But, this time the caller has some hints as to which objects to peruse first.

The hal workstation 132 may employ an indirect response. A file handle for a directory object is returned. After the directory is read and the attributes for each entry fetched, the caller is able to discern that there are four partial responses (named pat, joe, bob, svrail) and that the bob domain 122 has the highest group score (both number of hits and relevance score). Although a scored direct response is used to report the content located in the pat domain 126, joe domain 124 and svrail domain 128, an indirect response is used to report the bob domain 122's findings. This response actually resides on the bob domain 122, which is where the search was executed. Searching for the most relevant content, the caller navigates into the directory of the bob domain 122 and begins perusing its contents.

When there are only a few results to report, there is not much need to discriminate between results. The caller can just scan and evaluate each object. So, an un-scored direct response is an appropriate response form.

When there are a moderate number of hits to report, but they're all from the same source, a scored direct response is appropriate. Scores associated with each object convey hints as to which objects are the most likely to be relevant.

However, when the results number in the thousands (or millions!), search engines must structure the results in a manner that facilitates the caller's quest to locate some specific content. Indirect responses associate relevance scores with the paths to sub-domains, enabling the caller to discriminate between the results and navigate towards the desired content.

Referring again to FIG. 2, consider the processing of a search request targeting the inca domain 102:

The request, received by aztec (one of the two nodes hosting the inca domain 102), is forwarded on to the eng domain 112, the corp domain 116, the mrkt domain 118, and the sales domain 114.

The hal workstation 132 receives the request forwarded to the eng domain 112.

The hal workstation 132 forwards the request on to the bob domain 122 and svrail domain 128 and simultaneously initiates two local search threads which reference the cached indices of the pat domain 126 and joe domain 124.

The bob domain 122 receives a forwarded request and initiates a local search thread which references the (very up to date) inverted files maintained locally.

The svrail domain 128, a non-atomic domain, receives a forwarded request and forwards that request on to each of its sub-domains.

After a brief period the svrail domain 128 receives indirect responses from each sub-domain:

The svrail domain 128 composes its response by creating a response directory and then creating entries in that directory for each response received from a sub-domain.

Each directory created in the response directory has the same name as the sub-domain whose results are contained within.

The svrail domain 128 generates a composite relevance score and stores that data in the response directory's attributes.

Finally, the svrail domain 128 dispatches its response back to the hal workstation 132.

In similar fashion, the hal workstation 132 creates a response directory and then creates entries in that directory for each of its sub-domain's responses. In this case, the joe and pat entries could be files (un-scored direct responses). The hal workstation 132 generates a composite relevance score and stores that data in the response directory's attributes. Finally, the hal workstation 132 dispatches its response back to aztec.

In similar fashion, aztec creates a response directory and then creates entries in that directory for each of its sub-domain's responses. However, searches of the corp domain 116 and of the mrkt domain 118 respectively reported "no hits", so no corp or mrkt entries were created in the response directory. aztec generates a composite relevance score and stores that data in the response directory's attributes. Finally, aztec dispatches its response back to the caller.

The caller receives the response from aztec, which contains:

a SUCCESS status indicator, a file handle, and attributes containing a relevance score and an indicator as to the type of object associated with the returned file handle (file or directory).

The caller reads the response directory and discovers the eng and sales responses. Further perusal discloses that the results namespace hierarchy reflects the primary namespace.

Namespace Discrimination

Any attempt to create a directory within a search results parallel namespace is interpreted (and processed!) as a search request. The directory name (the last component of the CreateDirectory pathname parameter) is interpreted both as a search specification string and as the new directory's name.

So, for example, if the user navigates to the folder "\Internet\com\inca\!_Search_Results_!\(computer OR PDA) AND network\eng" and attempts to create a directory, the search mechanism is invoked to search the eng domain 112 with the directory name interpreted as the search specification. The content searched includes only the content contained within the current parallel namespace (the results of a previous search).

This is a means of selectively refining a search by navigating into a region of dense results and then applying additional search criteria to further discriminate the results. Note that various dense regions of a search may be selectively discriminated using different criteria.

Namespace Coherency

The "\...\!_Search_Results_!\(computer OR PDA) AND network\eng" folder contains content matching the query "(computer OR PDA) AND network" within the eng domain 112. This folder may be searched for content matching "Palm OR Handspring" and the results (references to Palm or Handspring PDAs with networking capabilities) will be stored the "\ . . . \!_Search_Results_!\(computer OR PDA) AND network\eng\Palm OR Handspring" folder.

Namespace coherency is the namespace property exhibited by the example just presented. Each component of the pathname of the "Palm OR Handspring" results folder accurately describes the content of that folder:

(computer OR PDA) AND network
   inca content matching the query.
(computer OR PDA) AND network\eng
   eng (an inca sub-domain) content matching the query.
(computer OR PDA) AND network\eng\Palm OR Handspring
   eng content matching the query:
     ((computer OR PDA) AND network) AND (Palm OR Handspring)

A Distributed Out-of-Band Signaling Mechanism

Geographically distributed applications may employ a global file system (such as DDS) to concurrently access a common file and, through a series of read and write operations, interact with each other. The DDS consistency mechanism guarantees clients that a read request always returns the most recently written data, even when continents and oceans separate the reader and the writer. Obviously, a strong consistency guarantee makes shared file access a more viable form of interprocess communication.

Without strong consistency guarantees, the burden of clear and consistent communications must be carried by the applications. This, of course, adds complexity to all applications, and requires that application level programmers provide a solution to a difficult problem that, most likely, lies outside of their areas of expertise.

Out-of-Band Signaling Between Distributed Processes

Out-of-band signaling provides an alternative to polling for detecting shared file modifications. It provides an extensible means for a process to define and register the types of file access events for which the process should receive immediate notification.

There are basically two private messages used to maintain client-side cache consistency:

Invalidate—discard cached file data (file identifier included in the message).
Recall—flush file modifications to server (file identifier in the message).

These messages are private, flowing only between a server and its client-side components. They are also out-of-band, meaning these messages exchange control information outside of normal file traffic data flow.

A server and its client-side components can be viewed as a distributed process. The service collectively provided is enhanced by out-of-band consistency control operations.

So the question arises:
Can other cooperating distributed processes benefit from out-of-band control channels?

The answer is yes, and the following bullets list some of the ways in which an out-of-band channel can be beneficially harnessed:

Two very remote processes communicate via an intermediary file server:
  Both processes open the file in write append mode and both request out-of-band notifications whenever the other process writes to the file.
  Process A "sends" a request to Process B by executing a synchronous write to the shared file.
  The intermediary file server receives the write data, appends it to the end of the file, issues a notification to Process B, and dispatches a response back to Process A.
  Process B receives the notification and immediately reads the shared file (from current access position to end of file) and thereby receives the request from Process A.
  Process B performs the operation requested by Process A and synchronously appends its response to the end of the shared file.
  The intermediary file server receives the write data, appends it to the end of the file, issues a notification to Process A, and dispatches a response back to Process B.
  Process A receives the notification and immediately reads the shared file (from current access position to end of file) and thereby receives the response from Process B.
  Process A continues sending requests and receiving responses until it decides to terminate the session.
  After session termination, the shared file is a complete log of the session. It may be saved or discarded according to established policies.

Two processes communicate via a memory mapped file:
  Both processes map the same file into their address space and both request out-of-band notifications whenever the other process modifies a specified location in the shared address space.
  Process A constructs a request to Process B in the shared memory and then synchronously writes the address of the request to the location specified by Process B. The synchronous write flushes all modifications to the server.
  The intermediary file server receives the flush request (the modifications), recognizes that Process B's specified location has been modified and issues a notification to Process B, and dispatches a flush response back to Process A.
  Process B receives the notification and immediately reads its specified location and retrieves a pointer to the request from Process A.
  Process B performs the operation requested by Process A and constructs its response in the shared memory and then synchronously writes the address of the response to the location specified by Process A. The synchronous write flushes all modifications to the server.
  The intermediary file server receives the flush request (the modifications), recognizes that Process A's specified location has been modified and issues a notification to Process A, and dispatches a flush response back to Process B.

Process A receives the notification and immediately reads its specified location and retrieves a pointer to the response from Process B.

Process A continues sending requests and receiving responses until it decides to terminate the session.

Two methods illustrating the use of an out-of-band communication channel were presented above, but there are practically an unlimited number of ways that multiple processes can coordinate their activities using out-of-band communications.

A method of establishing out-of-band communication channels is to extend the functionality of the consistency callback mechanisms employed by local file systems such as NTFS and distributed file systems such as DDS, NFS and CIFS in the following manner:

1. Provide a method for notification registration, by which application programs can register with the file system the file events for which notifications should be delivered. The preferred means of performing this registration is to define an IOCTL (I/O Control) function that identifies a specific file, directory, or object ("file" for the remainder of this disclosure) and then specifies the associated notification trigger event(s). The Linux man page SYNOPSIS for IOCTL is:

int ioctl(int fd, int cmd, char *argp);

fd—the file descriptor of the file to monitor
   cmd—the type of request
   argp—arguments pointer A registration may be synchronous or asynchronous:

Synchronous notification registration—cmd=SYNCNOTIFY

The IOCTL system call returns when a delivered notification message matches the file events specified in this registration.

Asynchronous notification registration—cmd=ASYNCNOTIFY

The IOCTL system call returns immediately and the notification routine whose address is specified as a parameter to this registration is called whenever a delivered notification message matches the file events specified in this registration.

2. Provide a method of representing and storing a file's associated notification trigger event(s) as extended attributes. These extended attributes, called notification attributes, are handled in the same manner as the regular attributes:
   a. they are cached and valid wherever the regular attributes are cached and valid,
   b. they are under the same consistency controls as the file's data and metadata (attributes),
   c. they are present (at least momentarily) and valid and may be referenced at some point in the processing of every file access request targeting the associated file or directory.

3. Provide a method of examining every file access request and detecting when the request satisfies the conditions of a notification trigger event represented in the file's notification attributes.

4. When a notification is triggered, provide a method of notifying all sites where the file is currently being accessed by extending the capability of DDS's (or other) distributed consistency control mechanism such that it can deliver notification messages in addition to RECALL and DISABLE messages. The structure of a notification message must convey the trigger(s) that initiated the dispatch of the message.

5. Provide a method by which the trigger(s) conveyed in a delivered notification message can be compared to the file events registered for this file at this site.

6. When the trigger(s) conveyed in a delivered notification message match the file events registered for this file at this site, provide a method by which a notification can be delivered to the application:
   Synchronous notification registration—Return from IOCTL call.
   Asynchronous notification registration—Invoke application's notification routine.

Although the present invention has been described in terms of the presently preferred embodiment, it is to be understood that such disclosure is purely illustrative and is not to be interpreted as limiting. The methods disclosed herein integrate a document retrieval mechanism into a distributed file system. The preferred retrieval mechanism is a full text retrieval system. However, the disclosed methods are also applicable to other retrieval systems which are integratable into a distributed file system using the disclosed methods. Though described in the context of DDS virtual file servers, the disclosed methods are also applicable to other distributed file systems such as NFS, CIFS and Appletalk, and to local file systems such as NTFS, UFS, and EXT2FS. Consequently, without departing from the spirit and scope of the disclosure, various alterations, modifications, and/or alternative applications will, no doubt, be suggested to those skilled in the art after having read the preceding disclosure. Accordingly, it is intended that the following claims be interpreted as encompassing all alterations, modifications, or alternative applications as fall within the true spirit and scope of the disclosure including equivalents thereof. In effecting the preceding intent, the following claims shall:

1. not invoke paragraph 6 of 35 U.S.C. §112 as it exists on the date of filing hereof unless the phrase "means for" appears expressly in the claim's text;
2. omit all elements, steps, or functions not expressly appearing therein unless the element, step or function is expressly described as "essential" or "critical;"
3. not be limited by any other aspect of the present disclosure which does not appear explicitly in the claim's text unless the element, step or function is expressly described as "essential" or "critical;" and
4. when including the transition word "comprises" or "comprising" or any variation thereof, encompass a non-exclusive inclusion, such that a claim which encompasses a process, method, article, or apparatus that comprises a list of steps or elements includes not only those steps or elements but may include other steps or elements not expressly or inherently included in the claim's text.

What is claimed is:

1. A method for incrementally indexing information contained in files within a distributed file system residing upon a virtual file server assembled by integrating a plurality of file servers comprising the steps of:

upon the commencement of a close operation on one of the files of the distributed file system after information contained in the file being closed has been changed:
parsing the information contained in the file; and
creating inverted index entries from the parsed information;

sorting the inverted index entries; and merging the sorted inverted index entries into inverted file records of an inverted file that is associated with content of the distributed file system;

wherein parsing of the information contained in the file, creating the inverted index entries, sorting of the inverted index entries and merging the sorted inverted index entries into the inverted file records are completed before the close operation is completed.

2. The method of claim 1 further comprising the step of including in each inverted index entry created from the parsed information a global scope object id which uniquely specifies an object contained within the distributed file system.

3. The method of claim 1 wherein closing the file initiates the sequence of parsing of the information contained in the file, creating the inverted index entries, sorting of the inverted index entries and merging the sorted inverted index entries into the inverted file records before the close operation is completed.

4. The method of claim 1 wherein merging the sorted inverted index entries into the inverted file records further comprises the steps of:

differencing the sorted inverted index entries against inverted index entries for a prior version of the file thereby producing a difference file containing inverted index entries that indicate additions and deletions to the file; and using the inverted index entries of the difference file to update the inverted file that is associated with the content of the distributed file system.

5. A method for incrementally indexing information contained in files within a file system residing upon a file server comprising the steps of:

upon the commencement of a close operation on one of the files of the distributed file system after information contained in the file being closed has been changed, and before the close operation is completed:

parsing the information contained in the file; and creating inverted index entries from the parsed information;

sorting the inverted index entries;

merging the sorted inverted index entries into inverted file records of an inverted file that is associated with content of the distributed file system; and after the close operation is completed, generating an indication that the file has been indexed and closed.

6. A method for incrementally indexing information contained in files within a file system residing upon a file server comprising the steps of:

upon the commencement of a close operation on one of the files of the distributed file system after information contained in the file being closed has been changed, and before the close operation is completed, initiating a sequence to:

parse the information contained in the file; and create inverted index entries from the parsed information;

sort the inverted index entries;

merge the sorted inverted index entries into inverted file records of an inverted file that is associated with content of the distributed file system; and after the close operation is completed, generating an indication that the file has been closed and is being indexed.

* * * * *